(12) United States Patent
Yao et al.

(10) Patent No.: US 12,038,634 B2
(45) Date of Patent: Jul. 16, 2024

(54) CHOLESTERIC LIQUID CRYSTAL COMPOSITE DISPLAY DEVICE

(71) Applicant: IRIS OPTRONICS CO., LTD., Tainan (TW)

(72) Inventors: Cheng-Hung Yao, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/231,225

(22) Filed: Aug. 7, 2023

(65) Prior Publication Data

US 2024/0045245 A1 Feb. 8, 2024

(30) Foreign Application Priority Data

Aug. 8, 2022 (TW) ................... 111129670

(51) Int. Cl.
| | | |
|---|---|---|
| *G02F 1/133* | (2006.01) | |
| *G02F 1/1347* | (2006.01) | |
| *G02F 1/137* | (2006.01) | |
| *G09G 3/18* | (2006.01) | |
| *G09G 3/20* | (2006.01) | |

(52) U.S. Cl.
CPC ...... *G02F 1/13306* (2013.01); *G02F 1/13478* (2021.01); *G02F 1/13718* (2013.01); *G09G 3/18* (2013.01); *G09G 3/2014* (2013.01); *G09G 2300/0486* (2013.01)

(58) Field of Classification Search
CPC ............ G02F 1/13306; G02F 1/13478; G02F 1/13718; G09G 3/18; G09G 3/2014; G09G 2300/0486
See application file for complete search history.

(56) References Cited

U.S. PATENT DOCUMENTS

| | | | | |
|---|---|---|---|---|
| 10,241,241 B2 * | 3/2019 | Tanaka | ............ | G02B 5/3083 |
| 2003/0090607 A1 * | 5/2003 | Kamijo | ............ | G02F 1/133555 349/96 |
| 2008/0137009 A1 * | 6/2008 | Kurosaki | ............ | G02F 1/1347 349/80 |

* cited by examiner

*Primary Examiner* — Sahlu Okebato
(74) *Attorney, Agent, or Firm* — Cheng-Ju Chiang

(57) ABSTRACT

A cholesteric liquid crystal composite display device includes a cholesteric liquid crystal reflective display device and a transmissive display device. The transmissive display device is located below the cholesteric liquid crystal reflective display device. When the cholesteric liquid crystal reflective display device is displayed in a transparent state, the light transmittance of the cholesteric liquid crystal reflective display device is higher than that of the cholesteric liquid crystal reflective display device when it is displayed in a dark state through a rated driving mode. Thereby, the display of the cholesteric liquid crystal composite display device is made clearer and the display quality is improved.

5 Claims, 3 Drawing Sheets

CHOLESTERIC LIQUID CRYSTAL COMPOSITE DISPLAY DEVICE

BACKGROUND OF THE INVENTION

1. Field of the Invention

The present invention relates to the field of display technology, and in particular to a cholesteric liquid crystal composite display device.

2. Description of Related Art

Nowadays, transmissive display devices such as LCDs, OLEDs, or mini LEDs, and some of them are self-illuminating and can potentially cause eye fatigue or injury to readers. Additionally, they are not easily readable under strong ambient light conditions. Conversely, reflective display devices like cholesteric liquid crystal displays are suitable for long-time reading or outdoor viewing due to their inherent characteristics. To meet these requirements, some inventions combine both types of displays to create a composite display device. However, when placing the reflective cholesteric liquid crystal display device above the transmissive display device, it must be in a transparent mode to avoid interfering with the display below. Nevertheless, cholesteric liquid crystal display devices often face the issue of insufficient transmissions during display, potentially impacting the display clarity of the transmissive device below.

Therefore, the present invention introduces a cholesteric liquid crystal composite display device to effectively address and overcome the aforementioned.

SUMMARY OF THE INVENTION

The objective of the present invention is to provide a driving method to effectively resolve the previously mentioned issues in the prior art. It aims to enhance the transparency of the reflective cholesteric liquid crystal display device when it is not in use or idle, thereby improving the clarity of the underlying transmissive display.

In order to achieve one or more of the aforementioned advantages, an embodiment of the present invention introduces a cholesteric liquid crystal composite display device comprising a cholesteric liquid crystal reflective display device and a transmissive display device.

The transmissive display device is disposed beneath the cholesteric liquid crystal reflective display device. When the cholesteric liquid crystal reflective display device is in a transparent state through the rated driving mode, the light transmittance of the cholesteric liquid crystal reflective display device is higher compared to its regular dark state display.

In certain embodiments, the rated driving method comprises a DDS (Direct Digital Synthesizer) driving scheme employed for driving the cholesteric liquid crystal reflective display device. When the device is in a transparent state, the voltage of the Evolution phase is reduced by 20% of the standard voltage, and the cycle time of Evolution phase is increased by 20% of the standard cycle time.

In some embodiments, the rated driving method comprises a PWM (Pulse Width Modulation) driving scheme for driving the cholesteric liquid crystal reflective display device. When the device is in a transparent state, both the Non-selection and Selection phases are subjected to the voltage corresponding to the dark state.

In some embodiments, the rated driving method comprises a PWM (Pulse Width Modulation) driving scheme or a DDS (Direct Digital Synthesizer) driving scheme for driving the cholesteric liquid crystal reflective display device. When the device is in a transparent state, the voltage of the Non-Selection phase is increased to at least 120% of the original voltage.

In certain embodiments, the voltage of the Non-Selection phase is increased to 120% to 200% of the original voltage.

In some embodiments, the transmissive display device may include LCD, OLED or mini LED.

In some embodiments, when the cholesteric liquid crystal reflective display device is in regular display mode, the transmissive display device is set to be dark color. When the cholesteric liquid crystal reflective display device is in a transparent state, the aforementioned transmissive display device operates in a general display mode.

Therefore, the present invention provides a cholesteric liquid crystal composite display device that utilizes a rated driving method to enhance the light transmittance of the cholesteric liquid crystal reflective display device, surpassing its light transmittance in a dark state. As a result, the transparency of the reflective cholesteric liquid crystal display device improves when not in use or idle, and the underlying transmissive display becomes clearer. This leads to a clearer display and an overall improvement in display quality for the cholesteric liquid crystal composite display device.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
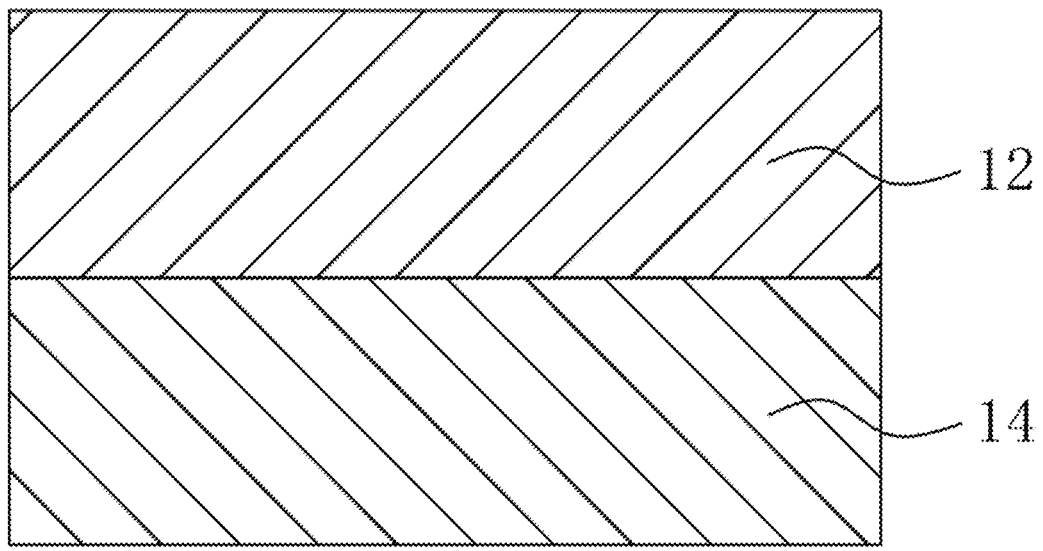
FIG. 1 is a schematic view of the structure of a cholesteric liquid crystal composite display device in accordance with the present invention.

Please refer to FIG. 1, which depicts a schematic view of a cholesteric liquid crystal composite display device 10 according to an embodiment of the present invention. In order to attain one or more of the aforementioned advantages, or other advantages, the present invention provides a cholesteric liquid crystal composite display device 10 that comprises a cholesteric liquid crystal reflective display device 12 and a transmissive display device 14.

The cholesteric liquid crystal reflective display device 12 generally has two driving schemes: DDS and PWM. These two driving schemes allow the cholesteric liquid crystal reflective display device 12 to display content by partially driving it into a Planar state (reflective state), resulting in a bright display. Additionally, the cholesteric liquid crystal reflective display device 12 can be partially driven into a Focal Conic state (transmissive state). When there is a black absorbing layer underneath, the Focal Conic state (transmissive state) can be displayed as a dark state.

The transmissive display device 14 is positioned beneath the cholesteric liquid crystal reflective display device 12. When the cholesteric liquid crystal reflective display device 12 is in a transparent state through the rated driving mode, its light transmittance is higher compared to when it is in a regular dark state. This results in an improved light transmittance for the cholesteric liquid crystal reflective display device 12. Through the rated driving mode, the light transmittance of the cholesteric liquid crystal reflective display device 12 is higher than when it is in a regular dark state display, thereby improving the light transmittance when it's not in the active state. The transparency of the reflective cholesteric liquid crystal display device makes the underlying transmissive display device 14 display images clearer, resulting in improved display quality for the cholesteric liquid crystal composite display device 10.

Figure 2:
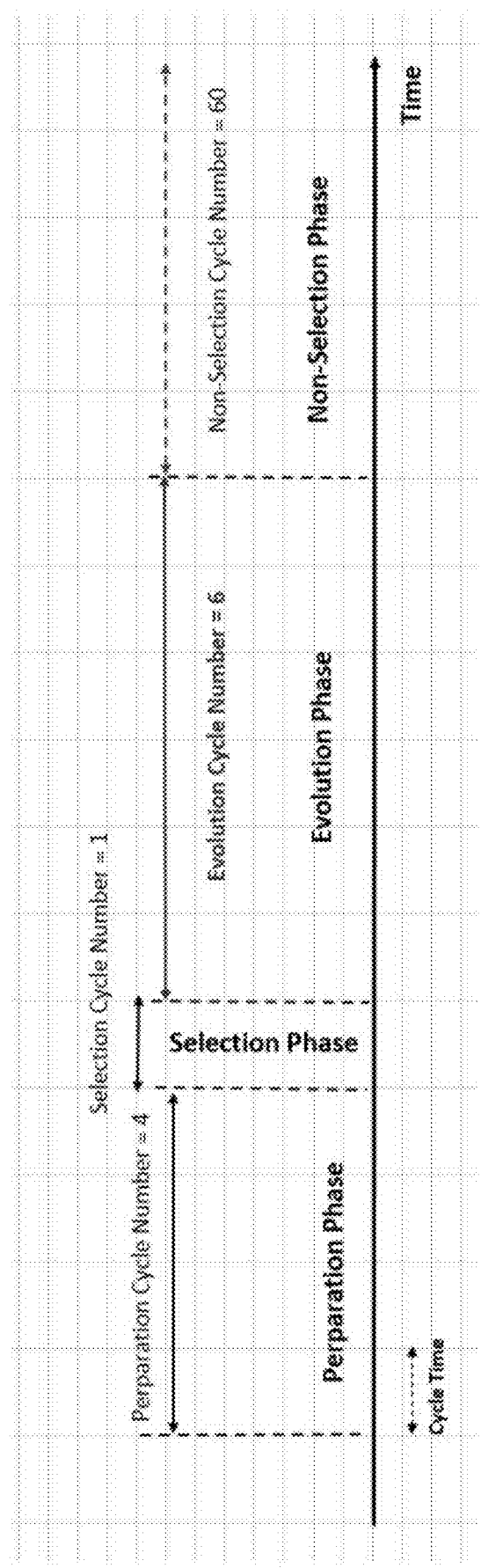
FIG. 2 is a schematic diagram of the DDS scan timing sequence of the cholesteric liquid crystal composite display device according to an embodiment of the present invention.

In some embodiments, as illustrated in FIG. 2, the rated driving method includes a DDS (Direct Digital Synthesizer) driving scheme to drive the cholesteric liquid crystal reflective display device 12. This scheme involves four sequential phases: Preparation, Selection, Evolution, and Non-Selection phases. During the Selection phase, when the voltage is low (approximately 0 V), the formation of the Focal Conic state (transmissive state) begins. The formation of the Focal Conic state (transmissive state) is completed while the Evolution phase is over. Conventionally, to ensure the formation of both the bright state and the dark state, the voltage during the Evolution phase should not be too low, such as being above 20 V. Additionally, the cycle time of the Evolution phase should not be excessively long, such as being less than 30 ms. If these conditions are not met, the bright state (reflective state) may be compromised, resulting in darker display images. However, this approach also limits the formation of the dark state (transmissive state) and fails to achieve the most optimal performance. In light of this situation, the inventor proposes a first approach: when the cholesteric liquid crystal reflective display device 12 is in the bright state, the voltage of the Evolution phase is reduced by 20% of the standard voltage, and the cycle time of the Evolution phase is extended by 20% of the standard time. The standard voltage and standard cycle time can be understood as the voltage and cycle time in a normal balanced state. For example, the voltage of the Evolution phase can be lowered to below 20 V, and the cycle time of the Evolution phase can be extended beyond the cycle time set in the original display mode's Evolution phase, such as exceeding 30 ms. It should be noted that since the full driving mode is used to transition the cholesteric liquid crystal molecules into the Focal Conic state (transmissive state), there is no need to consider the issue of the cholesteric liquid crystal reflective display device 12 in the bright state.

Figure 3:
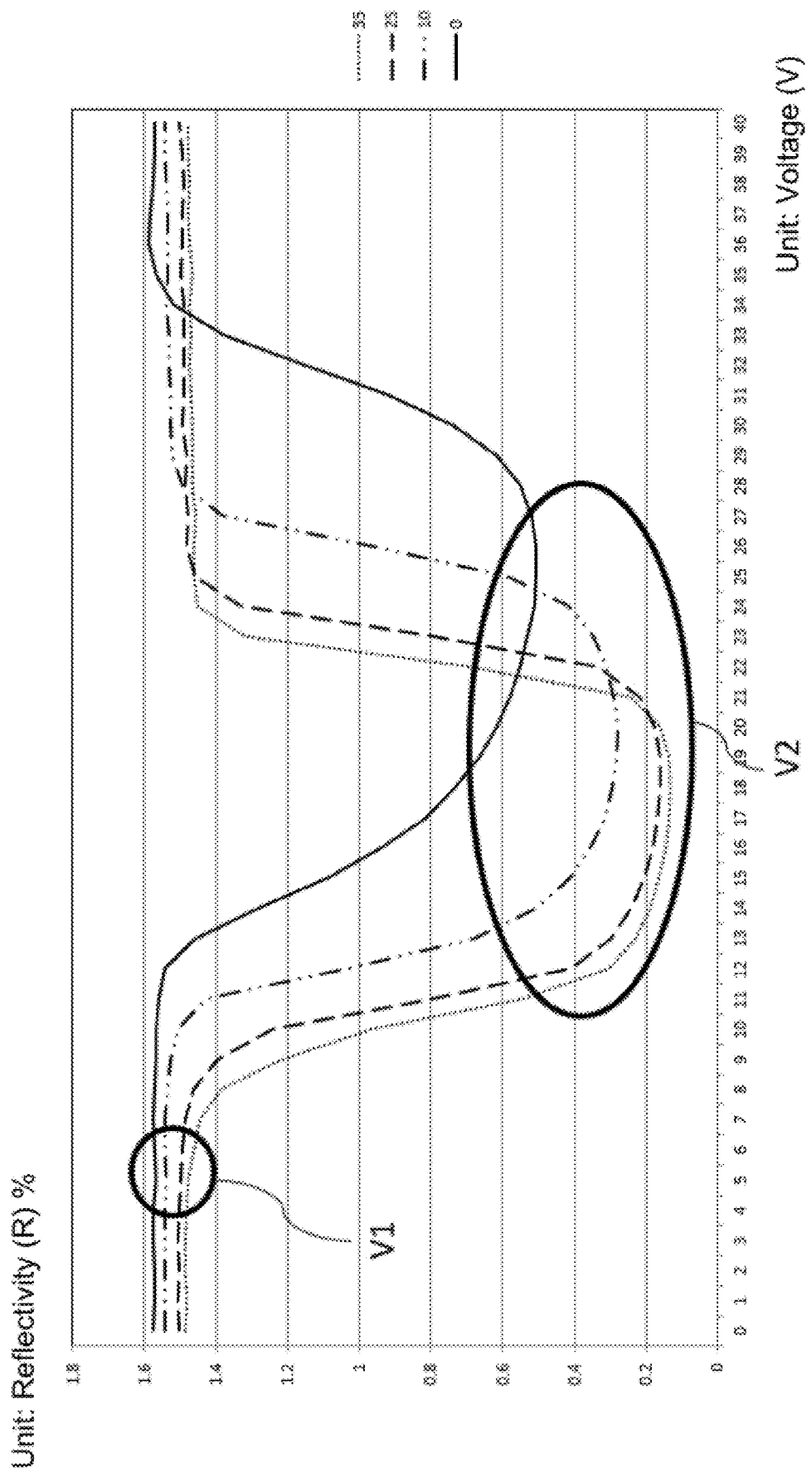
FIG. 3 is a schematic diagram of the PWM scan timing sequence of the cholesteric liquid crystal composite display device according to an embodiment of the present invention.

In some embodiment, as shown in FIG. 3, the horizontal coordinate (abscissa) of the graph represents applied voltages, and the vertical coordinate (ordinate) of the graph represents reflectivity. The rated drive method utilizes a PWM (Pulse Width Modulation) driving scheme to drive the cholesteric liquid crystal reflective display device 12. During the Selection phase, the voltage for the bright state (reflective state) is set to V1, as shown in FIG. 2, while the voltage for the dark state (transmissive state) is set to V2, also shown in FIG. 2. This ensures that each point on the display images will be set to either the bright state or the dark state. If the cholesteric liquid crystal reflective display device 12 is set to display in a transparent state, the Non-Selection and Selection phases are subjected to voltages in the dark state (transmissive state) (V2 as shown in FIG. 3). The cholesteric liquid crystal molecules are continuously subjected to voltages in the Focal Conic state, resulting in a significant increase in the ratio of cholesteric liquid crystal molecules transitioning to the Focal Conic state. As a result, the underlying transmissive display exhibits better image quality. That is, here is the second approach: when the cholesteric solid liquid crystal reflective display device 12 is set to display in a transparent state, voltages in the dark state are applied the Non-Selection and Selection phases. Thus, the cholesteric liquid crystal molecules are continuously subjected to voltages of the Focal Conic state, resulting in a significant increase in the ratio of cholesteric liquid crystal molecules transitioning to the Focal Conic state. The underlying transmissive display exhibits better image quality as well.

In some embodiments, the rated driving method includes a PWM driving scheme or a DDS driving scheme to drive the cholesteric liquid crystal reflective display device 12. Regardless of whether the DDS or PWM driving schemes are employed, the display devices generally do not experience high voltage in the Non-Selection phase. As illustrated in FIG. 3, voltage V1 serves as a turning point for the transition from the Planar state to the Focal Conic state. If the voltage in the Non-Selection phase is excessively high, the liquid crystal molecules will start transitioning to the Focal Conic state, which adversely affects the brightness (reflective state) of the cholesteric liquid crystal reflective display device 12. On the contrary, the inventor proposes an increase in the voltage of the Non-Selection phase above the original voltage used for display (e.g., if the original voltage is 5 V, the voltages in this special transmissive mode can be set to 6 V or higher). This significant increase in voltage greatly enhances the ratio of liquid crystal molecules transitioning to the Focal Conic state, resulting in a clearer underlying transmissive display. Consequently, the cholesteric liquid crystal composite display device 10 achieves a much clearer display and improved display quality. Thus, the third approach suggests increasing the voltage in the Non-Selection phase to at least 120% of the original voltage when the cholesteric liquid crystal reflective display device 12 is in a transmissive state. More preferably, the voltage in the Non-Selection phase is increased to 120% to 200% of the original voltage for optimal results.

In some embodiments, the transmissive display device 14 may include LCD, OLED or mini LED.

In some embodiments, when the overlying cholesteric liquid crystal reflective display device 12 is set to display, the underlying transmissive display device 14 is configured to appear dark (such as completely black) in order to function as a black absorbing layer for the cholesteric liquid crystal reflective display device 12. Conversely, when the underlying transmissive display device 14 is set to display, the overlying cholesteric liquid crystal reflective display device 12 is driven into a Focal Conic state (transmissive state) and becomes transparent. This allows the light beams emitted from the underlying transmissive display device 14 to pass through the overlying cholesteric liquid crystal reflective display device 12, creating the desired display pattern. In other words, while the cholesteric liquid crystal reflective display device 12 is in a regular display mode, the transmissive display device 14 appears dark. However, when the cholesteric liquid crystal reflective display device 12 is in a transparent state, the transmissive display device 14 operates in a regular display mode.

In addition, the special transparent configurations of display devices mentioned above are not limited to a single option; they can also be used in combination. For instance, consider a cholesteric liquid crystal display device with a resolution of 1024×768, where the bottom of the device features a black absorbing layer. When driven by the PWM driving scheme, the reflectivity of the dark state (Focal Conic state) is 6.4% (equivalent to 93.6% transmittance). On the other hand, when driven by the DDS driving scheme, the reflectivity of the dark state is 4.8% (equivalent to about 95.2% transmittance). If both the second approach and the third approach are employed simultaneously, the cholesteric liquid crystal display device is driven by the PWM driving scheme during the Selection and Non-Selection phases, allowing for the adjustment of the voltage to achieve the desired dark state. The voltage of the dark state is increased from the original display voltage of 20 V to 25 V. As a result, through measurements, the reflectivity of the dark state is reduced to 2.9% (equivalent to approximately 97.1% transmittance). This significant improvement in transparency in the transmittance mode leads to enhanced display quality.

It is understood that the term 'regular display' or 'conventional display' refers to a display where images are shown in a normal manner, and the brightness or darkness of different portions depends on the displayed images. In the case of a cholesteric liquid crystal display operating in the regular display mode, the dark state corresponds to the transparent state, although the transmittance is not ideal. Therefore, the purpose of the present invention is to achieve a transparent state with high transmittance.

In summary, the present invention utilizes a cholesteric liquid crystal composite display device 10 with a rated driving method. This method enhances the light transmittance of the cholesteric liquid crystal reflective display device 12, making it higher than that of the device in the dark state. As a result, the transparency of the reflective cholesteric liquid crystal display device is improved when it is not in use or idle. This improvement allows the underlying transmissive display to appear clearer, enhancing the overall display quality of the cholesteric liquid crystal composite display device 10.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal composite display device, comprising:
    a cholesteric liquid crystal reflective display device; and
    a transmissive display device, disposed beneath the cholesteric liquid crystal reflective display device;
    wherein the cholesteric liquid crystal reflective display device is in a transparent state through a rated driving method so that a light transmittance of the cholesteric liquid crystal reflective display device in the transparent state is higher than a light transmittance of the cholesteric liquid crystal reflective display device in a regular dark state thereof; and
    wherein the rated driving method comprises a DDS (Direct Digital Synthesizer) driving scheme for driving the cholesteric liquid crystal reflective display device, and when the cholesteric liquid crystal reflective display device is in the transparent state, a voltage of an Evolution phase of the DDS driving scheme is reduced by 20% of a standard voltage when the cholesteric liquid crystal reflective display device is in a normal balance state, and the Evolution phase is increased by 20% of a standard cycle time when the cholesteric liquid crystal reflective display device is in the normal balance state.

2. The cholesteric liquid crystal composite display device according to claim 1, wherein the transmissive display device is selected from a group including LCDs (Liquid Crystal Displays), OLED (Organic Light-Emitting Diode) displays, and mini LED (Light-Emitting Diode) displays.

3. The cholesteric liquid crystal composite display device according to claim 1, wherein when the cholesteric liquid crystal reflective display device is in a regular display mode, the transmissive display device appears as a dark color, and when the cholesteric liquid crystal reflective display device is in the transparent state, the transmissive display device operates in a general display mode.

4. A cholesteric liquid crystal composite display device, comprising:
- a cholesteric liquid crystal reflective display device; and
- a transmissive display device, disposed beneath the cholesteric liquid crystal reflective display device;
- wherein the cholesteric liquid crystal reflective display device is in a transparent state through a rated driving method so that a light transmittance of the cholesteric liquid crystal reflective display device in the transparent state is higher than a light transmittance of the cholesteric liquid crystal reflective display device in a regular dark state thereof; and
- wherein the rated driving method comprises a PWM (Pulse Width Modulation) driving scheme and a DDS (Direct Digital Synthesizer) driving scheme for driving the cholesteric liquid crystal reflective display device, and when the cholesteric liquid crystal reflective display device is in the transparent state, a voltage of a Non-Selection phase of the PWM driving scheme is increased to at least 120% of an original voltage for display when the cholesteric liquid crystal reflective display device is in the transmissive state.

5. The cholesteric liquid crystal composite display device according to claim 4, wherein the voltage of the Non-Selection phase is increased to 120% to 200% of the original voltage.

* * * * *